Nov. 4, 1941.  J. D. ALTEMUS  2,261,821
VEHICLE STEERING AND STABILIZING MECHANISM
Filed Nov. 16, 1938  8 Sheets-Sheet 1

INVENTOR:
James Dobson Altemus,
BY
His ATTORNEY

Nov. 4, 1941.     J. D. ALTEMUS     2,261,821
VEHICLE STEERING AND STABILIZING MECHANISM
Filed Nov. 16, 1938     8 Sheets-Sheet 2

INVENTOR:
James Dobson Altemus,
BY
His ATTORNEY

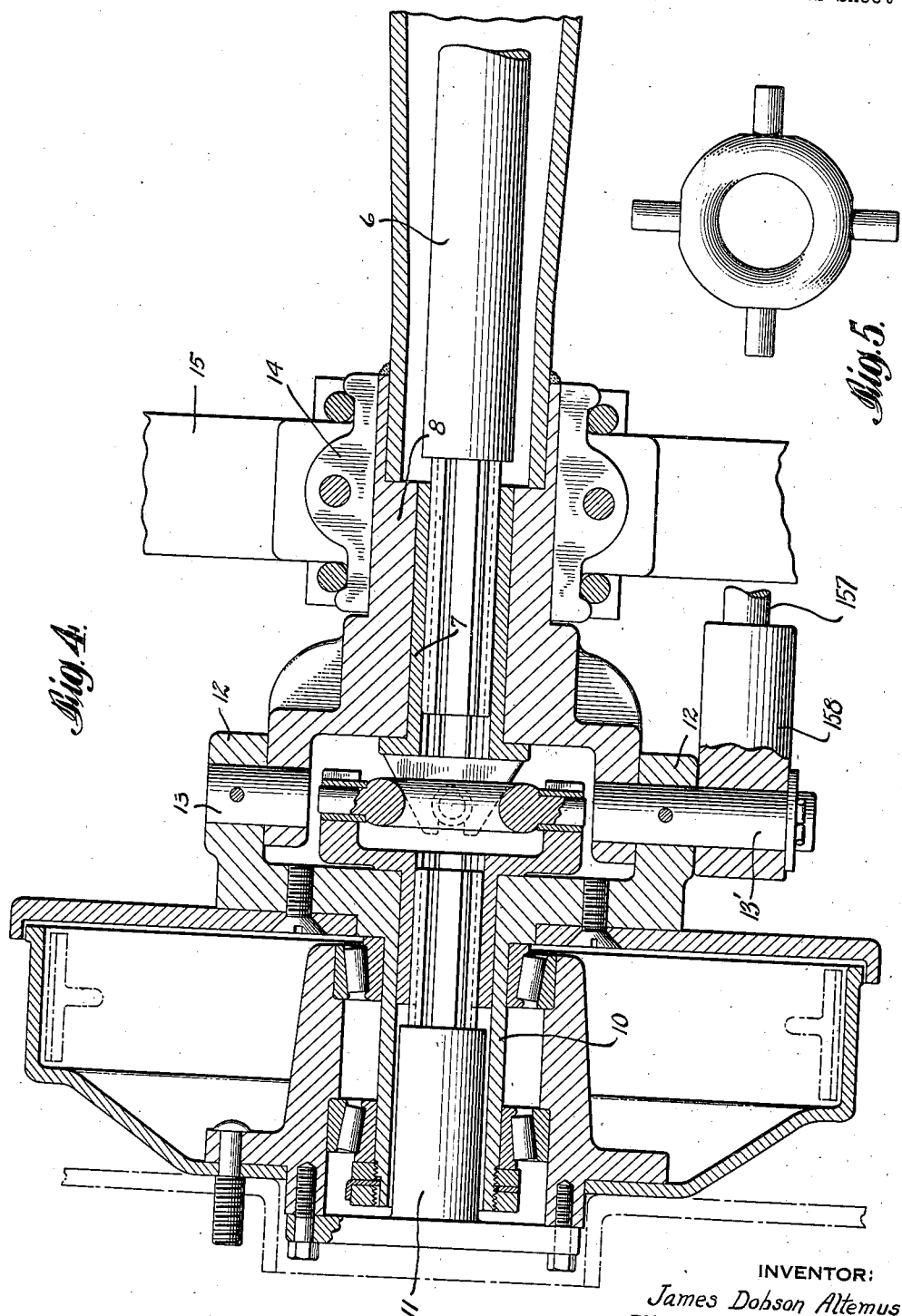

Nov. 4, 1941.  J. D. ALTEMUS  2,261,821
VEHICLE STEERING AND STABILIZING MECHANISM
Filed Nov. 16, 1938  8 Sheets-Sheet 4

INVENTOR:
James Dobson Altemus,
BY
His ATTORNEY.

Nov. 4, 1941.   J. D. ALTEMUS   2,261,821
VEHICLE STEERING AND STABILIZING MECHANISM
Filed Nov. 16, 1938   8 Sheets-Sheet 5
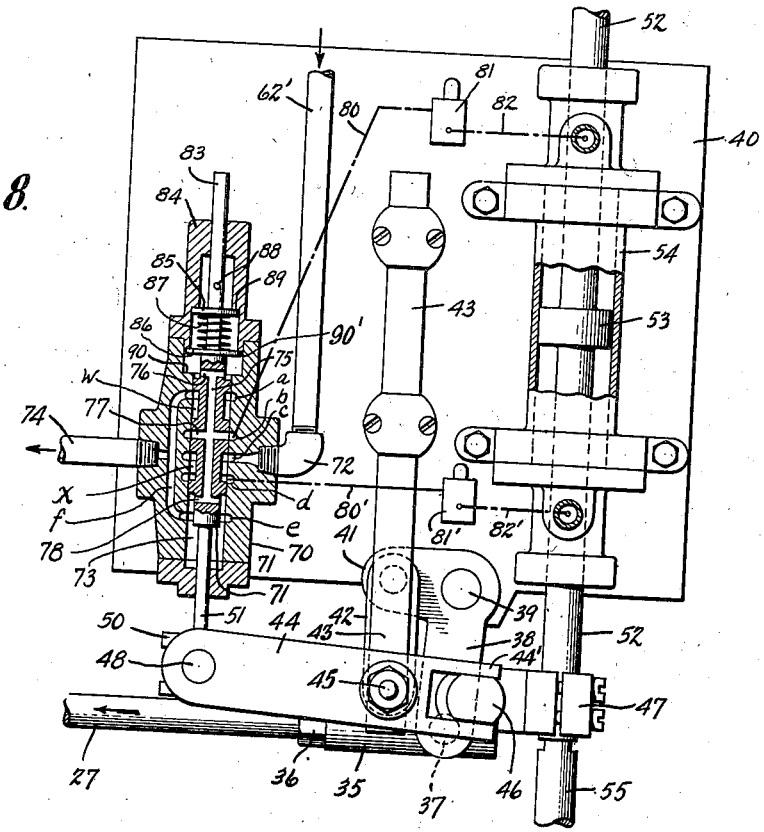
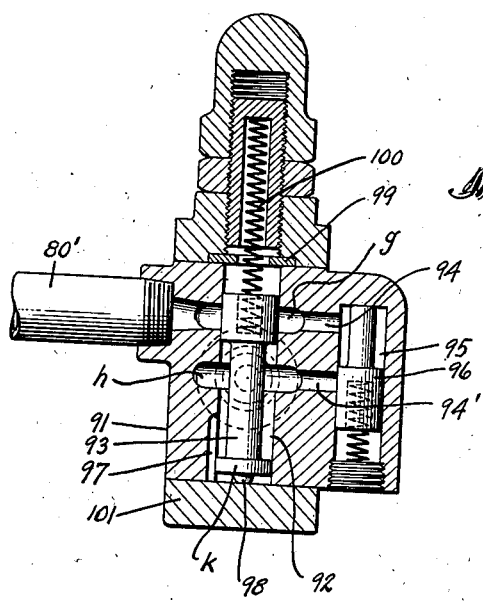
INVENTOR:
James Dobson Altemus,
BY
*His* ATTORNEY.

Nov. 4, 1941.  J. D. ALTEMUS  2,261,821
VEHICLE STEERING AND STABILIZING MECHANISM
Filed Nov. 16, 1938  8 Sheets-Sheet 6

INVENTOR;
James Dobson Altemus,
BY
HIS ATTORNEY.

Nov. 4, 1941.   J. D. ALTEMUS   2,261,821
VEHICLE STEERING AND STABILIZING MECHANISM
Filed Nov. 16, 1938   8 Sheets-Sheet 7

INVENTOR:
James Dobson Altemus,
BY
His ATTORNEY.

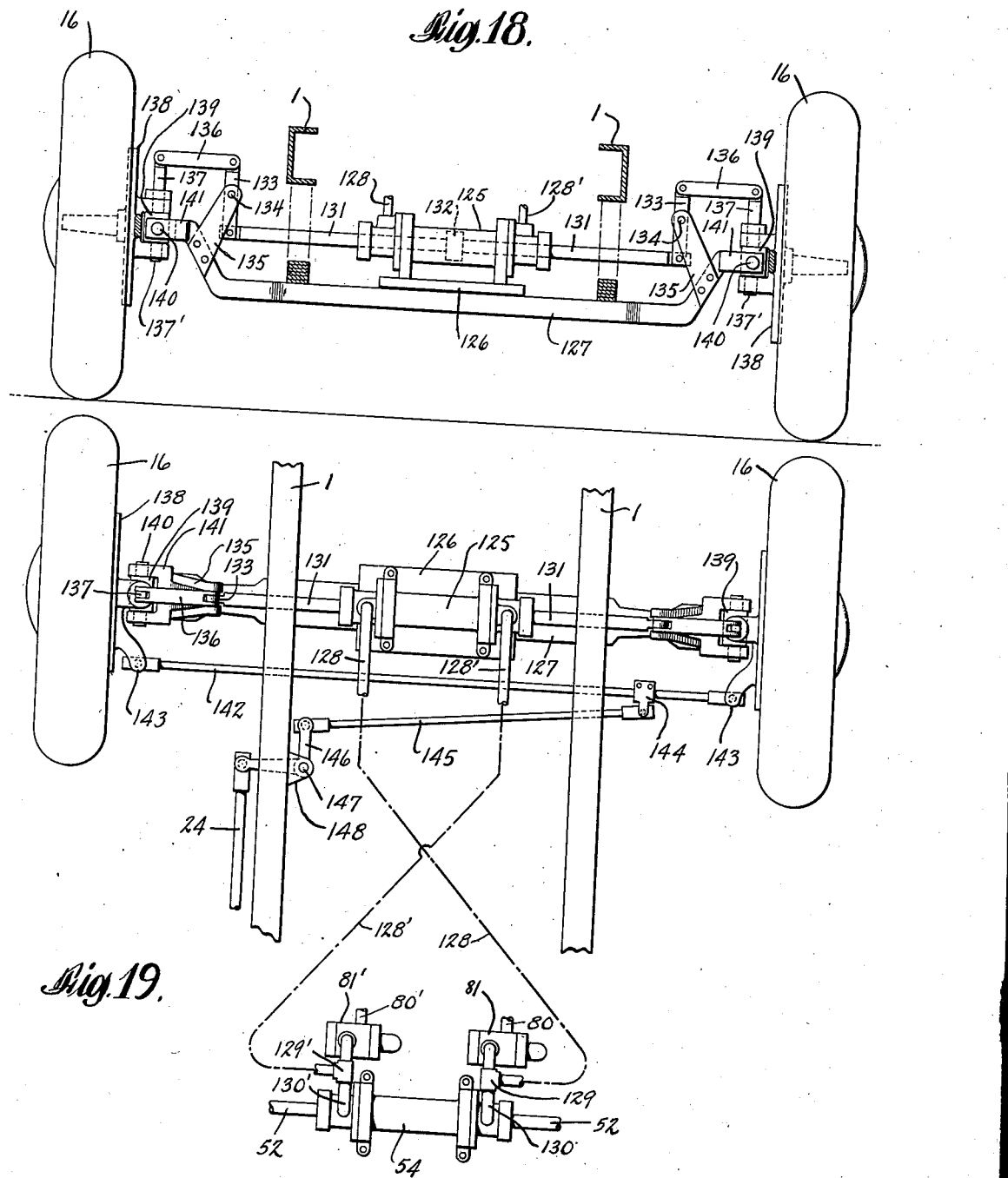

Patented Nov. 4, 1941

2,261,821

UNITED STATES PATENT OFFICE 2,261,821

VEHICLE STEERING AND STABILIZING MECHANISM

James Dobson Altemus, Roslyn, N. Y.

Application November 16, 1938, Serial No. 240,747

15 Claims. (Cl. 280—87)

This invention relates to wheel tilting mechanism for vehicles, especially automobiles, trains and airplanes and has for its particular objects the provision of a simple, cheap and sturdy mechanism for accomplishing that purpose which requires little or no effort on the part of the driver to set the same in operation and which mechanism is adapted to prevent or at least minimize the tendency of the wheels of a motor vehicle to skid under the influence of centrifugal force when rounding a sharp turn in the road or track over which the vehicle is traveling or under other conditions of travel, such as a wet pavement, for example, when skidding might otherwise occur. Further objects of the invention are the provision of means for positively locking the wheels in any tilted position assumed thereby until released by the operation of the tilting mechanism so that in the event the tilting mechanism thereafter fails to function the wheels will remain in their tilted position even when the steering wheels have been alined with the longitudinal axis of the vehicle so that further progress of the vehicle will not seriously be interfered with.

Another important object of the invention is the provision of means for rendering the tilting mechanism automatically and directly responsive to the amount of centrifugal force or movement developed by the rear end of the vehicle so that the extent of the tilt of the rear wheels will vary both with the degree of angularity of the curve of the road or track which is being rounded by the vehicle as well as the degree of its speed and also, in the case of wet pavement, by the extent of what may be termed its skidding impulse. Other advantages of my invention are hereinafter set forth.

I am well aware that it has been proposed, as set forth in Patent No. 1,556,631 to tilt the front wheels of a vehicle in the direction in which the same is turning in order to throw the center of gravity nearer to the inside of the curve to reduce the wear of the front tires or the tendency of the tires to be thrown off the wheels when rounding a curve as well as to enable corners to be turned at greater speed. Also that in Patent No. 980,508 it has been proposed to tilt all four wheels of a vehicle when turning a corner in proportion to the sharpness of the turn. However, the mechanism therein disclosed is solely dependent for its operation directly upon the pressure force applied by the arms of the driver upon the steering wheel and the muscular strain imposed upon the driver to accomplish such tilting, particularly in those cases where it is desired to tilt the rear wheels of the vehicle or both the rear and front wheels, it is not only very fatiguing but particularly if the vehicle is relatively heavy or travelling at high speeds, the actual steering of the vehicle and consequently the tilting of the wheels is rendered extremely difficult and frequently almost impossible to accomplish, due primarily to the extra load imposed on the steering mechanism by the associated tilting mechanism.

My investigations have led to the discovery that in order to realize to the utmost the advantages that can be obtained by the tilting of the wheels of the automobile whenever desired, the same must be effectively accomplished, either automatically or else by the driver himself, but without imposing any appreciable additional muscular strain on the driver beyond that which would be required for the turning of the steering wheels were no such tilting operation simultaneously accomplished.

My invention is fully set forth in the following detailed description and drawings forming a part thereof, in which latter—

Fig. 4 is an enlarged detail vertical section taken on the line 4—4 of Fig. 2;

Fig. 5 is a detail elevation of a center piece of the Cardan joint, isolated, by which the half-axles and spindles of the rear wheels are articulated to admit of their tilting;

Fig. 8 is a detail, fragmentary plan view generally similar to that shown in Fig. 7 but showing the parts of the mechanism in the position initially assumed when the steering wheels of the vehicle have started their turning movement but prior to the tilting movement of the rear wheels;

Fig. 9 is a fragmentary detail elevation of one of the relief valves of the booster mechanism;

Fig. 18 is a fragmentary front elevation, partly in section; and Fig. 19 is a fragmentary plan view, showing the manner in which the tilting mechanism can be applied to all four wheels of a vehicle.

Figure 1:
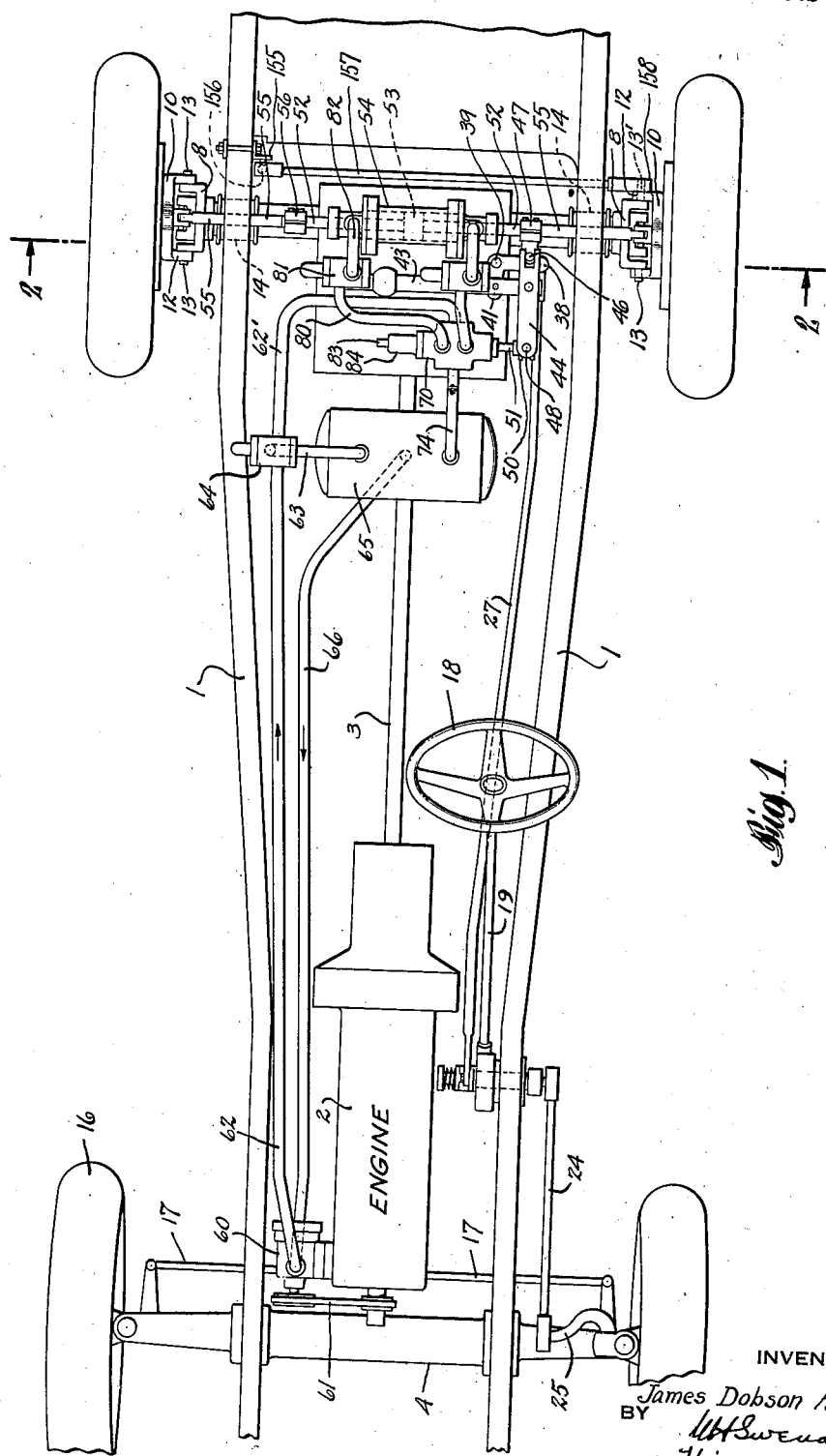
Figure 1 is a plan view of an automobile chassis equipped with my improved tilting mechanism for accomplishing the tilting of the rear wheels of the vehicle in consonance with the turning of the front steering wheels.

Referring to the automobile construction disclosed in Figures 1 to 12 of the drawings, the reference numeral 1 designates the longitudinal frame members of the chassis, 2 the engine, 3 the main or propelling shaft, 4 the front axle, 5 the differential housing, 6 one of the driving spindles or axles for the rear wheels, 7 an abbreviated axle tube which is splined thereto and which is mounted in a bearing block 8. Each axle tube 7 (only one being shown) is articulated by means of a typical Cardan joint to a second but abbreviated axle tube that is rotatably mounted in the flanged wheel axle 10 and splined to the wheel spindle 11. The flange of said wheel axle 10 is articulated by means of the yoke 12 and trunnions 13, 13' to the aforesaid bearing member 8 and thereby the tilting of the rear wheels, while in motion, can be accomplished by the wheel tilting mechanism hereinafter described. The pillow-block 14 carried by a transverse frame member supports the springs 15 and said bearing member 8.

The front wheels 16, which are articulated to the front axle 4 in the usual manner and linked together by the connecting rod 17, are turned in the conventional manner, upon rotation of the steering wheel 18, through the coaction of the steering post 19, and also worm gear 21, shaft 22, pitman 23, pitman rod 24 and arm 25. The shaft 22 has an enlarged portion 22' on which is loosely fitted an operating lever 26 to which is pivotally connected a drag link 27. The hub of said lever abuts a spring pressed collar 28 which is splined to the shaft 22 and which has a central tooth 29 of triangular cross-section which normally extends into a cooperating recess 30, also of triangular cross-section, which is formed in the adjacent face of the lever hub. A heavy compression coil spring 31 is interposed between said collar 28 and a terminal collar 32 which is pinned to the shaft member 22' and said spring is sufficiently powerful to normally cause the collar 28 to interlock with the lever and to move therewith but to admit of the independent turning of the shaft 22' and consequently of the normal steering of the vehicle by the turning of the front wheels in the event the drag link 27 becomes nonresponsive to the rotary movements of the steering post due to a jam in the hereinafter described hydraulic tilting mechanism.

Said drag link 27, which as shown is adjustably connected to the lever 26 to admit of varying the throw imparted thereto by said lever, has an adjustable sleeve 35 threaded thereon and which is secured in any adjusted position by a lock-nut 36. Said sleeve is pivotally connected by a knuckle pivot 37 carried thereby to the long arm 38 of a bell-crank lever whose fulcrum 39 is rigidly connected to a main support plate 40 carried by the chassis. The short arm 41 is pivoted to link 42 whose outer end is pivoted to a slide bar 43 and to a lever 44 by a pivot 45 carried by the latter. The lever 44 has a fork 44' on its rear end, which embraces a trunnion 46 carried by an extension of a connecting block 47, and also has a pivot 48 mounted on its other end which has an enlarged head or shoe 49 on its lower end that engages a spool 50 formed on the end of a piston rod 51 of a control valve hereinafter described. Said block 47 is clamped to the reduced section of one of the piston rods 52 carried by a double-acting piston 53 which reciprocates in a hydraulic cylinder 54 to form a hydraulic jack, and at its lower end said block is forked and pivotally secured to an extensible link 55 which in turn is articulated to the flange of the axle 10 of the adjacent rear wheel (see Fig. 2). A similar block 56 is secured in the same manner to the other piston rod of said piston except that the same is not provided with a trunnion and supporting extension therefor. Said latter block is similarly connected by a second link 55 to the other rear wheel.

A ported valve controls and directs the flow of motive fluid, for example oil, delivered by a rotary liquid pump 60, preferably of the vane type, the pulley of which is connected by belt 61 to the engine shaft whereby it is constantly rotated when the engine is running. The pipe 62 delivers fluid from the pump through a relief or safety valve 64, hereafter described, thence through pipe 62' to the control valve, unless there is a stoppage in the system in which event, when the pressure exceeds a predetermined maximum amount, it passes directly from the relief valve, through by-pass 63, to the storage tank 65 from which it is free to return through the pipe 66 to the pump.

The said control valve comprises a cylinder 70 in which a spring-pressed or elastically mounted spool-shaped piston 71 is arranged to reciprocate in a short path with a pulsating action, so to speak, during the steering of the front wheels right or left, in response to pressure successively and oppositely exerted thereon, first by the drag link 27 and then by the main piston 53 acting through the intermediate connections upon the piston rod 51 of the control valve. Motive fluid is delivered to the cylinder 70 through the fitting 72. The bore 73 of the principal portion of said cylinder is of uniform circular cross-section except for a series of annular surface grooves $a$, $b$, $c$, $d$ and $e$ that are formed in the cylinder wall. A duct $f$ interconnects the grooves $a$ and $e$ and also communicates at the center thereof with the outlet pipe 74 which discharges into the storage tank 65. The groove $c$ is in permanent communication with the inlet fitting 72 and the intake pipe 62' which latter communicates through the relief valve 64 with the delivery pipe 62.

The piston 71 of the control valve has a series of similar peripheral grooves $w$ and $x$ formed on its periphery and also an axial duct 75 which opens through the ends thereof and permanently intersects three transverse ducts 76, 77 and 78. These grooves and ducts are so located that when the piston is in the neutral position (see Fig. 6), the central transverse duct 77 which is located midway between grooves $w$ and $x$ aforesaid, will be in communication with said groove $c$ and the intake nipple 72 which permanently communicates with the latter and said transverse ducts 76 and 78 will register with the said grooves $a$ and $e$, respectively, and both will be in direct communication with the duct $f$ which delivers into the outlet pipe 74. Normally, when the vehicle is traveling in a straight path, the parts assume the neutral position shown in Fig. 6 and the motive fluid will circulate freely through the system, the same being delivered under pressure from the "high side" of the pump, through a conduit 62 to relief valve 64, thence through intake conduit 62' to control valve 70, thence through outlet pipe 74 to tank 65 from which it returns to the "low side" of the pump. When, however, the piston is in the wheel-tilting position shown in Fig. 8, the transverse duct 77 will register with groove $b$, hence no fluid can enter the same from the nipple 72, and the ducts 76 and 78 will respectively be in direct communication with the enlarged bore of the cylinder and with the space around the reduced front end of the piston, which latter space communicates with the duct $f$ and pipe 74.

As above explained, all the transverse ducts and the axial duct 75 of the piston are in permanent communication with each other so that if any one is brought into registry with a groove in the cylinder walls or said duct $f$, all the other piston ducts will also communicate therewith. The grooves $b$ and $d$ permanently communicate with the pipes 80 and 80', respectively (these pipe lines being shown diagrammatically in Fig. 6) and said pipes respectively communicate through relief valves 81 and 81' with pipes 82 and 82' that communicate with the opposite ends of the hydraulic power cylinder 54. The said piston 71 has a reduced rod-like extension 83 on its rear end which extends through the end cap 84 of cylinder 70 and serves as a guide therefor. Discs 85 and 86 are loosely mounted on the extension 83 and a light compression coil spring 87 which assists the return movement of the piston to a neutral position and insures the smooth positive movement thereof by the lever 44, is mounted on said extension intermediate the same. A pin 88 serves to engage the disc 85 and effect compression of spring 87 upon outward movement of piston 71, thereby assisting as aforesaid its return to a neutral position. Shoulders 89, 90 and 90' respectively serve as seats for the discs 85 and 86. The relief valves i. e. safety valve 64 and the pressure-regulating valves 81 and 81' are of essentially the same construction, except that in the case of the valves 81 and 81' the lower wall aperture, opposite the inlet into which the pipes 80 and 80' discharge, is plugged up.

Now, referring to the construction of these valves as shown in detail in Fig. 9, the same comprises a body 91 having a cylindrical central bore 92 in which a piston 93 of generally dumb-bell configuration reciprocates. Annular surface grooves $g$ and $h$ are formed in the wall of the said bore and these grooves are in permanent communication with transverse ducts 94 and 94', respectively, which ducts intersect the supplemental longitudinal bore 95, the duct 94 being in permanent communication with said bore 95 and the duct 94' being in communication with said bore 95 when the spring-pressed plunger 96 is depressed sufficiently to uncover the outer terminal of duct 94'. A longitudinal surface groove 97 affords permanent passage around the cylindrical head $k$ of said piston 93 and a projecting boss 98 serves to space the piston from the outer end of the bore and to thereby admit fluid passing beyond the head $k$. The inward movement of the piston is checked by the disc 99 and is always resisted by a heavy coil spring 100, the same being capable of exerting 500 lbs. pressure, in the case of the safety relief valve 64, and about 50 to 100 lbs. pressure in the case of the relief valves 81 and 81'. The oppositely disposed pipes 62 and 62' permanently communicate with each other through annular groove $h$ of said relief valve 64 and in the event the tilting mechanism becomes jammed, said safety valve opens communication between pipes 62 and 63 if the pressure in the system exceeds that of the spring 100 and thereby the motive fluid returns to the pump via tank 65 and return pipe 66. The bore 92 of valves 64, 81 and 81' is sealed at the outer end by a plate 101.

Figure 3:
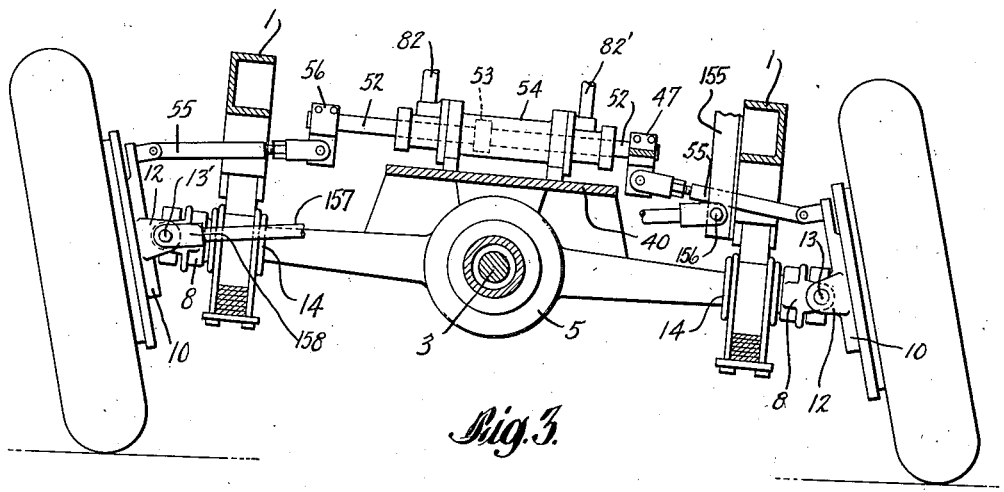
Fig. 3 is a section similar to Fig. 2 but showing the rear wheels in an extreme tilted position as when the vehicle is rounding a sharp turn.
Figure 13:
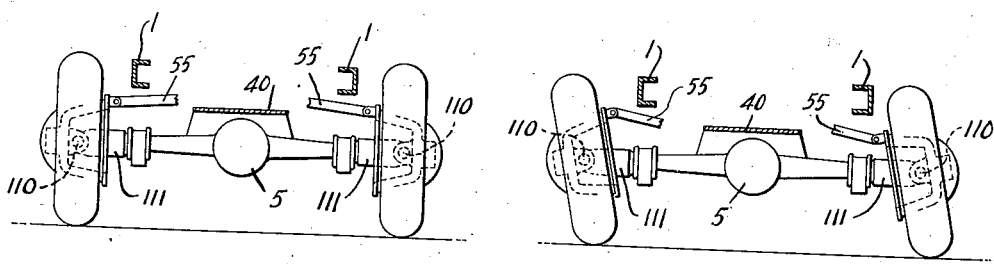
Figs. 13 and 14 are fragmentary, vertical sections, generally similar to Fig. 2, of a modified form of mounting, the rear wheels wherein the Cardan joint by which the wheels are articulated to the half axles is located in the central plane of the wheel, said wheel in the former figure being in a normal or vertical position and in the latter figure in a tilted position.
Figure 14:
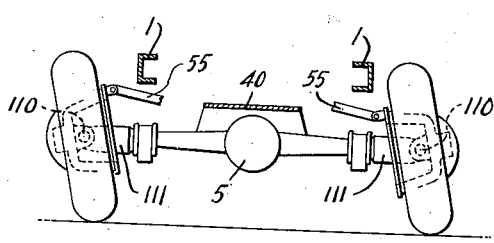

In the modification illustrated in Figs. 13 and 14, the trunnion 110 by which each rear wheel is articulated to the bearing member 111 is located in the central plane of the wheel, approximately, in lieu of the position in which trunnion 13 is located (see Fig. 4) and consequently any undesirable tilting of the body of the vehicle, in the manner shown in Fig. 3, is virtually prevented as the rear wheels are tilted on rounding a turn or under other conditions of travel.

Figure 15:
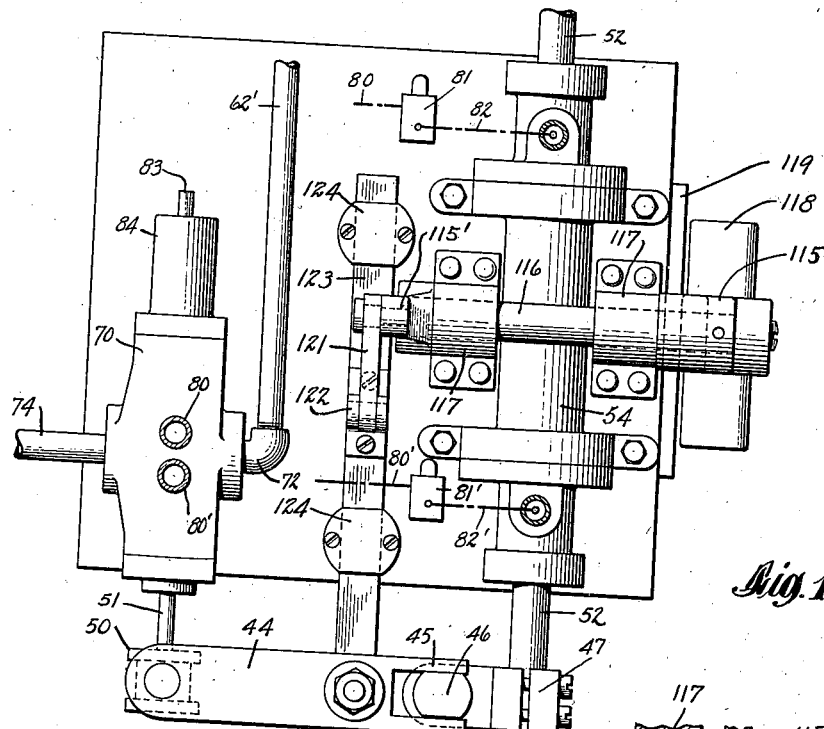
Fig. 15 is a fragmentary plan view of a modification wherein the tilting mechanism is automatically activated in direct response to the centrifugal power thrust of a pendulum member.
Figure 17:
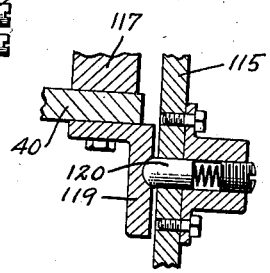
Fig. 16 is a fragmentary elevation showing said pendulum member and Fig. 17 is a section on the line 17—17 of Fig. 16.
Figure 16:
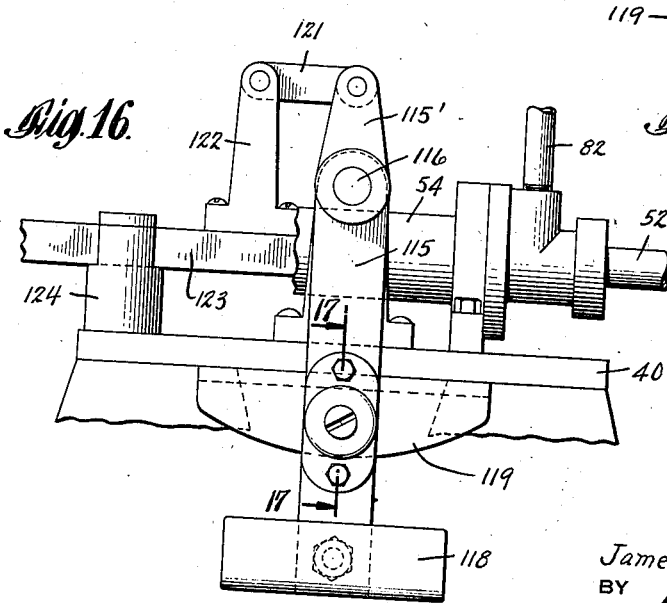

In the modification illustrated in Figs. 15 and 16, wherein the automatic, as distinguished from the manual, tilting of the rear wheels is accomplished, the construction is essentially the same as illustrated in Figs. 1 to 9 inclusive, except that in lieu of manually effecting the movement of the slide bar 43 and lever 44 through the drag link 27 which is operatively connected with the steering wheel 18, I provide pendular suspension means that is responsive to centrifugal thrusts imparted thereto by the centrifugal force developed at the rear end of the vehicle whether the same results from the extent that the front wheels are turned or from the speed of travel when rounding a turn in the road or whether due to the skidding impulse of the wheels when traveling over wet pavements, especially in the latter case where the brakes are suddenly applied to the wheels. Such pendular suspension means for accomplishing the aforesaid automatic tilting of the wheels comprises a vertical lever 115 which is rigidly secured to a rocker-shaft 116 that is mounted in bearing block 117, carried by the main support plate 40. A cylindrical weight 118, weighing about 10 pounds for example, is rigidly bolted to the lower end of said lever. A depending guide plate 119 is carried by the plate 40, the same lying behind the rear face of said lever 115. Said plate 119 has a depression formed therein, of a configuration corresponding to slightly less than a hemisphere, which is adapted to receive the rounded outer end of a spring-pressed detent or locking pin 120 that is carried by and normally projects from the inner face of lever 115.

Said rocker-shaft 116 has a crank arm or lever 115' rigidly secured to its inner end and which arm is pivotally connected to a horizontal link 121 that is in turn pivotally connected to a post 122 on the slide bar 123. The latter is mounted in bearings 124 carried by the plate 40 in the same manner that the slide bar 43 is mounted in its bearings.

As is apparent from the foregoing description of the pendular suspension means, the same will normally be held against chattering by the detent 120 while the vehicle is in motion but the instant an impulse, due to centrifugal force developed at the rear end of the vehicle, is imparted to the weight sufficient to depress the detent and release the weight, the same will swing in an arcuate path in the direction of the thrust and thereby effect rotation of the rocker arm in the same direction. Such movement of the rocker arm effects, through the link 121, the sliding movement of the slide bar 123, for example inwardly when the rocker shaft rotates clockwise (viewed from the rear end of the vehicle) and outwardly, when the rocker shaft rotates anti-clockwise. Such movements of the slide bar will respectively impart the same movements to the piston rod 51 as when the steering wheel in the construction shown in Fig. 1 is turned respectively in a clock-wise or anti-clockwise direction.

In the construction shown in Figs. 18 and 19, an additional wheel-tilting hydraulic power cylinder 125 is mounted on a support plate 126 supported by the front drop axle 127 and said cylinder is connected through crossover pipes 128, 128' and T's 129, 129' with pipes 130, 130' that correspond to the pipes 82, 82' which communicate with the opposite ends of the rear hydraulic power wheel-tilting cylinder 54. The respective piston rods 131 of the double-acting piston 132 which reciprocates in said cylinder 125 are respectively connected to levers 133 which are pivotally mounted on fulcrums 134 carried by the forked support 135 which is in turn secured to said axle 127. Said levers 133 in turn are connected through links 136 with the upper elongated vertical pivots 137 and 137' by which the hubs 138 of the front wheels are articulated to the trunnion block 139 that also carries trunnions 140 diametrically opposed to trunnions 137, 137', by which said block is articulated to the terminal yoke 141 carried by the drop axle 127.

A connecting rod 142 is connected at its respective ends through ball joints with the arms 143 that are rigidly secured to said hubs 138. A block 144 is rigidly secured to said rod 142 adjacent one end thereof and a drag link 145, which is articulated to a ball joint to said block 144, serves to interconnect said block with a bell crank lever 146 to which said drag link 145 is also articulated by means of a ball joint. The latter lever is pivotally mounted on a fulcrum 147 carried by a bracket 148 secured to the longitudinals of the vehicle frame. Said bell crank lever is articulated by a ball joint to a pitman rod 24, which corresponds to the pitman rod shown in Fig. 1 and which is similarly connected to the steering wheel of the vehicle. Said pipes 130, 130' communicate with the relief valves 81 and 81' shown in Fig. 1.

Figure 2:
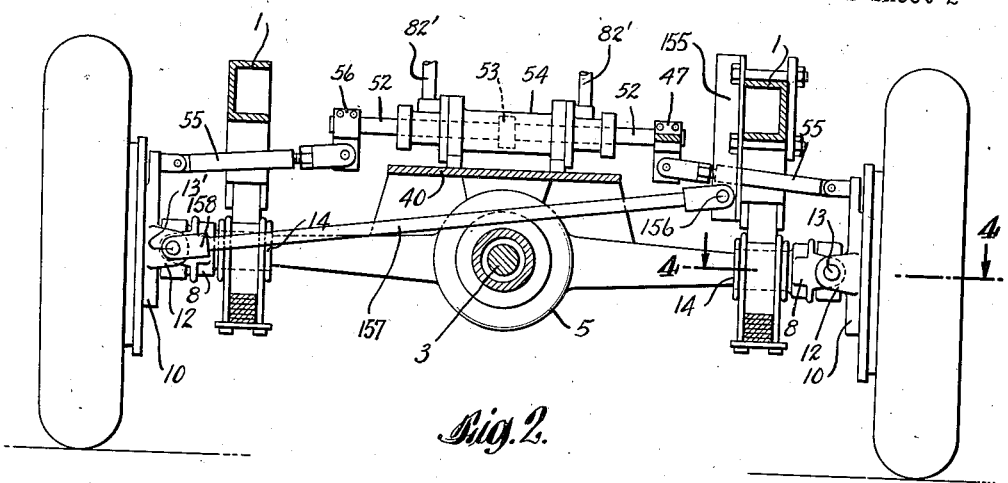
Fig. 2 is an enlarged detail vertical section, taken on the line 2—2 of Fig. 1, and in which the wheels are shown in their normal vertical position

In Figs. 1, 2 and 3 in particular, I have illustrated special bracing means for rear end of the chassis or underframe of the vehicle which for convenience of illustration is not shown in certain figures of the drawings even though in all modifications of the invention it is desired that same be employed. Such bracing means serves to effectively stiffen the frame and to reduce body sway through resisting or minimizing the twisting of the frame under the torque exerted thereon by obstacles in the road or where one of the rear wheels rides upon over the sidewalk curb, the same being especially effective for preventing the pendular wheel-tilting mechanism from operating when the vehicle passes over such obstacles when neither rounding a curve nor skidding. Such bracing means comprises a bar 157 which is pivotally secured at one end to the elongated trunnion 13' and at its other end is rigidly secured to an angle iron bracket 155 carried by the longitudinal 1 at the opposite side of the vehicle. Such brace tends to maintain the main springs, which directly support the differential housing 5 and the support plate 40 carried thereby and from which latter pendulum is suspended, substantially motionless with respect to the longitudinals 1 in the event one of the wheels should ride over obstacles as aforesaid when the vehicle is not skidding or rounding a turn and thereby incidental and unnecessary tilting of the rear wheels will be substantially prevented under such conditions.

While my invention has been illustrated as applied to an automobile, having rubber tires, adapted to travel on highways or race-tracks, it is also peculiarly applicable to the flanged steel wheels of locomotives and of the cars of passenger and freight trains, as thereby without changing the road bed to increase the banking of the turns thereof, it is possible to very materially speed up the movement of the trains since the tilting action of the wheels will tend to cause the same to effectively grip the rails and prevent the trains jumping the tracks at such increased speed beyond that for which the curves and the road bed are at present designed.

Figure 11:
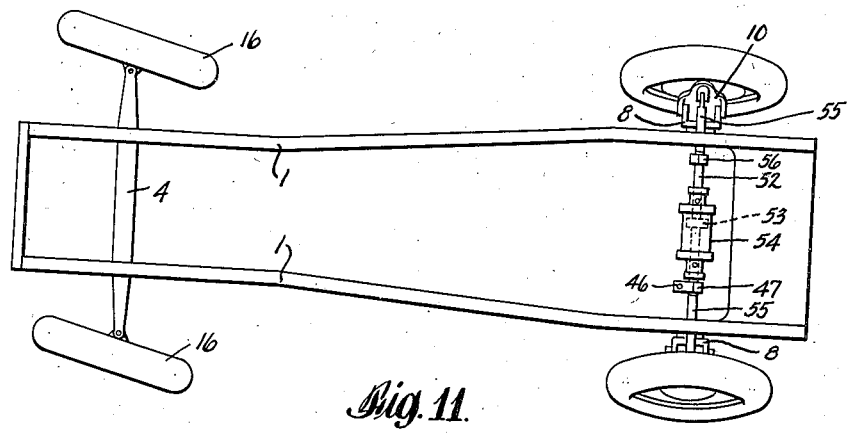
Figs. 11 and 12 are plan views, generally diagrammatic, showing the tilted position assumed by the rear wheels when the front wheels are turned to veer to the right and left, respectively.
Figure 12:
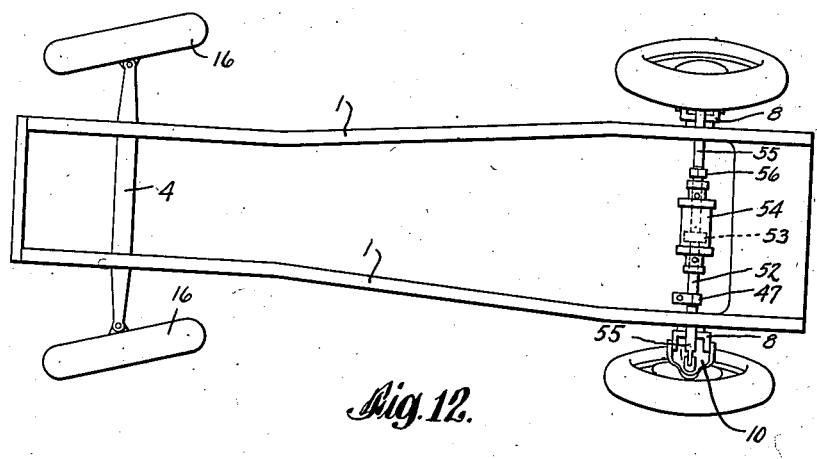
Figure 10:
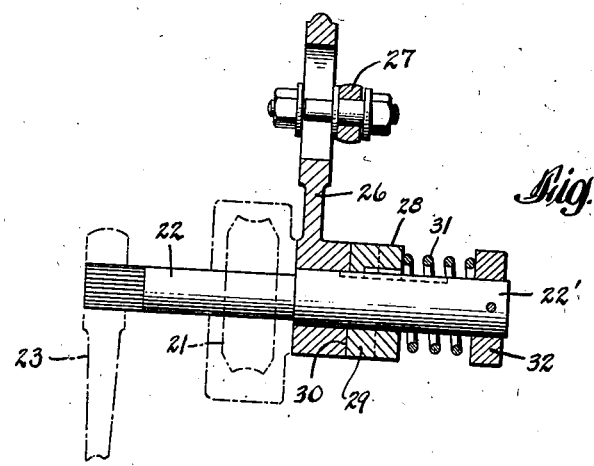
Fig. 10 is a vertical section taken on the line 10—10 of Fig. 6.

The operation of the wheel-tilting mechanism illustrated in Fig. 1 is as follows:

Assuming that the driver desires to round a right turn in the road and the wheels are turned to the right by a clockwise rotation of the steering wheel so as to cause the front wheels to eventually assume the position shown in Fig. 11, such rotation of the steering wheel will cause the end of shaft 22' through the coaction of the steering post 19 and worm gear 21 and the associated coacting parts to rotate anti-clockwise (viewed from the left of Fig. 10), and consequently said drag link 27 will be given a forward thrust in the direction of the arrow shown in Fig. 8. Such movement of the drag link accomplishes a forward pull of the long arm 38 of the bell-crank lever aforesaid (see Fig. 8) which in turn effects the inward movement of the slide bar 43, whereupon the forked lever 44, which is a floating lever having two fulcrums 45 and 46 about which it alternately moves, turns about the trunnion 46 as a fulcrum and forces the piston rod 51 of the control valve inwardly to the position shown in Fig. 8. Such movement of the piston rod 51 and the piston 71 carried thereby will interrupt communication between the central duct 77 and the central groove $c$ of the cylinder 70, since the piston will have assumed the position shown in Fig. 8. In this position communication will be established between the motive fluid intake pipe 62' and the left end of main cylinder 54 (viewed from the rear thereof) since the motive fluid passes through the intake fitting 72, cylinder groove $c$, piston groove $x$ and cylinder groove $d$ to pipe 80', pressure regulating valve 81' and pipe 82' to said left end of the cylinder 54. The motive fluid so entering the cylinder 54 at the left end thereof causes the instant movement of the piston 53 to the right (viewed from the rear) thereby simultaneously effecting, through the links 55, the outward tilting of the top of the right rear wheel and the parallel inward tilting of the top of the left rear wheel.

Figure 6:
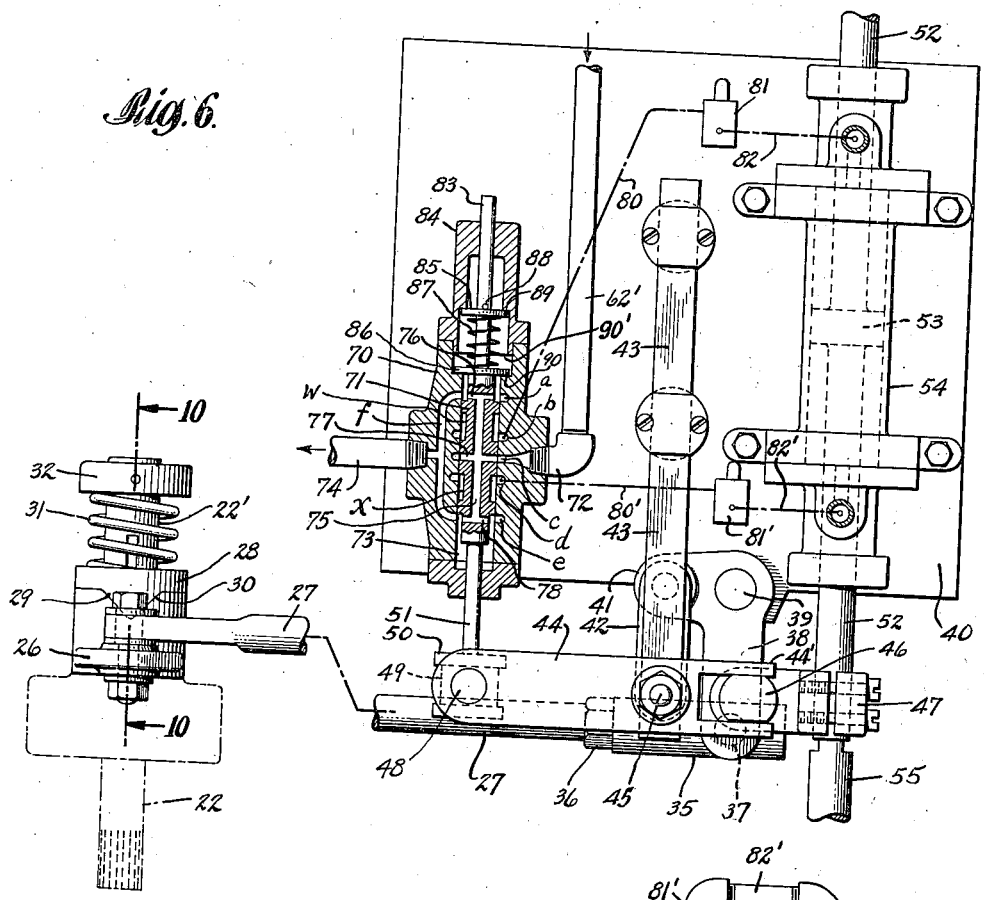
Fig. 6 is a fragmentary plan view, partly in section and Fig. 7 an elevation of the hydraulic booster mechanism employed for effecting the desired tilting of the rear wheels of the vehicle, the parts being in the position assumed when the wheels are in a normal vertical position.
Figure 7:
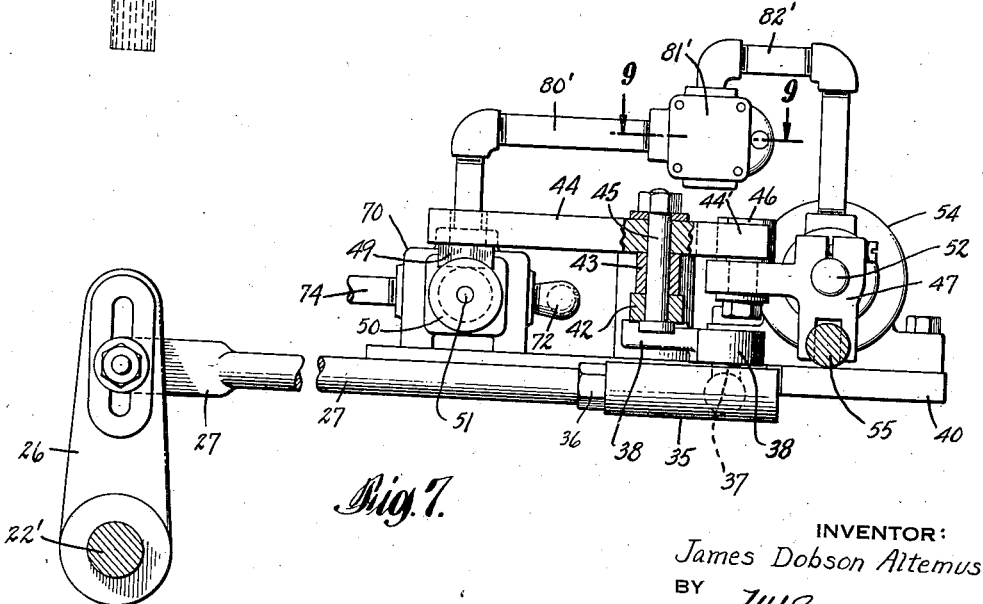

Such movement of the piston 53 and its piston rod 52, toward the right, causes a corresponding movement, also to the right, of the block 47 and the trunnion 46 carried thereby and the latter, acting on the lever 44 through its fork 44', causes it to pivot about the pivot 45 whereby said lever 44 tends to resume its original position shown in Fig. 6 and to pull the piston rod 51 until the piston 71 returns to the neutral position shown in Fig. 6, but such return of the lever 44 to the central or original position cannot occur so long as the driver uninterruptedly continues to turn the steering wheel in a clockwise direction. During the interval that the motive fluid is flowing into the left end of the cylinder 54 (viewed from the rear) from the groove $d$ of the control valve with which it is in communication, the opposite end of the cylinder 54 will be in communication through pipe 82, pressure-regulating valve 81, pipe 80, cylinder groove $b$, ducts 77, 75, and 78 of the piston and duct $f$ in the cylinder wall to pipe 74, thence to tank 65 and return pipe 66 to the "low side" of the rotary pump 60.

The moment the driver ceases the further clockwise turning of the steering wheels of the vehicle, then the pressure exerted to the drag link 27 and the intermediate connections upon the lever 44 and piston rod 51 will be insufficient to counterbalance the pressure exerted upon the piston rod 51 through lever 44, trunnion 46 on the block 47, carried by piston rod 52, and the piston 53 of the power cylinder, due to the aforesaid movement to the right (viewed from the rear) of said piston 53. Consequently the forked lever 44 will turn on pivot 45 as a fulcrum and the long arm thereof will move outwardly i. e. to the left, thereby returning the piston 71 of the ported valve to a neutral position, whereupon the rear wheels will be temporarily locked in the tilted position so assumed thereby until there is a further turning movement of the steering wheel by the driver, clockwise. Such further turning of the steering wheel will cause the further tilting of the rear wheel, in the same direction as the wheels were previously tilted by such prior clockwise movement of the steering wheels, until the piston 53 has moved the maximum distance to the right permitted by the block 47, which acts as a stop upon engagement with the end of cylinder 54. In the event, however, the driver should continue to thereafter turn the steering wheel, then the safety mechanism or spring clutch, illustrated in detail in Fig. 10, comes into play and permits of such further turning of the steering wheel and the front wheels of the vehicle, clockwise, notwithstanding the fact that the block 47 limits further movement of the piston 53 as aforesaid.

The pressure regulating valves 81 and 81' serve to automatically prevent excessive tilting of the rear wheels should one of the rear wheels of the vehicle, during the period when the tilting mechanism is operating to tilt the wheels, pass over an obstacle that would exert a thrust which would tend to assist such tilting action of the rear wheels, since in order to effect the movement of the piston 53, the fluid behind the same must escape at the same rate that fluid is injected into the opposite end of the cylinder and against the front of the valve. This can only occur when the tilting impulse applied to the wheels exceeds the counterpressure exerted by the springs 100 of the particular pressure regulating valves which communicate with the opposite face of the piston to that against which the fluid is admitted from the "high side" of the pump and in such an event the plunger 93 will be elevated by the fluid escaping from the cylinder 54 against the action of the spring 100 of the particular valve 81 or 81' that so communicates with the rear of the piston 53, thus allowing the motive fluid to escape into the pipe by which said valve is connected to the control valve 70, namely the pipe 80' or 80.

Preferably the pressure of the springs 100 in the pressure regulating valves 81, 81' is between 50 and 110 lbs. per square inch which is sufficient to resist shocks from common obstacles such as stones or ruts or other irregularities in the road which would otherwise tend to assist or initiate the tilting action. Also preferably the pressure of the spring 100 in the safety valve 64 is about 550 lbs. per square inch and the pressure of the fluid delivered by the pump 60 into the pipe 62 is preferably about 1000 lbs.

Since as above stated any movement of the steering wheel of the vehicle in a clockwise direction which is sufficient to move the piston 71 to the position whereby the groove $x$ of the piston uncovers both grooves $c$ and $d$ and allows the motive fluid to pass into pipe 80' and thence to the left end of cylinder 54, results in an immediate movement of the trunnion 46, thereby causing the piston 71, under the influence of the pressure exerted by said trunnion 46 to resume its neutral position, it is apparent that, during the continued or uninterrupted clockwise turning of the steering wheel, the wheels will be tilted in consonance therewith.

The return of the tilted rear wheels to their original vertical position or the tilting of these wheels in the opposite direction from that accomplished when the drag link 27 was moved forwardly as aforesaid, in the direction of the arrow shown in Fig. 8, is of course accomplished by a reversal of the above described cycle of movements of the pistons 71 and 53, since when the drag link 27 is caused by an anti-clockwise movement of the steering wheel, to move rearwardly, the piston 71 will move outwardly—not inwardly as indicated in Fig. 8—and consequently the groove $w$ of the piston 71 will be uncovered and will afford communication between grooves $c$ and $b$ and thus in turn affording communication through pipes 80, valve 81 and pipe 82 with the right end of cylinder 54 (viewed from its rear) whereupon its opposite end will then be in communication, through pipe 82', valve 81', pipe 80', groove $d$, ducts 77, 75 and 78 and duct $f$ in the cylinder wall with pipe 74, tank 65 and return pipe 66, with the "low side" of pump 60.

The provision of automatic pendular control of the wheel-tilting mechanism has several important advantages over the manual control thereof by the driver through the steering wheel, in that the pendulum is highly sensitive to centrifugal force exerted on its weight 118 due to a side thrust on the vehicle and the said weight 118 is accordingly free to move in the event of a side thrust that would tend to initiate a skid, in an ordinary automobile, even prior to the substantial sidewise skidding of the vehicle so equipped with such pendular wheel-tilting mechanism, and also since the pendulum in rounding a turn at high speed, is responsive to the degree of curvature of the turn in the road and also to the rate of speed of the vehicle, the tilting effect accomplished thereby will be proportionate both to the degree of curvature of the turn as well as the speed of the vehicle, rather than being merely governed, as is the case with the manual wheel-tilting mechanism, by the extent to which the front wheels of the vehicle are turned in rounding a bend or curve in the road.

The anti-skidding effect which is accomplished by my improved wheel-tilting mechanism on automobiles equipped with rubber tires, is due to the fact that instead of the tires tending to buckle or fold under the wheel rim of a wheel that is rotating in a vertical plane, such as is ordinarily the case in the present automobile, and which tendency actually contributes to the skidding of the wheel of the vehicle, the tires in an automobile equipped with my improved wheel-tilting mechanism, are actually rolled transversely through a small arc and exert a wedging action against the pavement, thereby effectively resisting the tendency of the wheels to skid on the pavement.

My improved wheel-tilting mechanism materially prolongs the life of the tires on wheels equipped therewith in the case of vehicles having pneumatic tires since the frictional wear, due to skidding, which invariably occurs even to a minute extent in the case of slight turns in the road and to a much greater extent in the case of sharp bends which are traversed at high speed, is very materially reduced and the wear is chiefly confined to the ordinary frictional wear due to rotation of the wheels as they travel over the pavement, such wear for example occurs in the ordinary automobile when the same is travelling along the straight-away.

Various changes and modifications of the construction herein described, within the scope of the appended claims, may be made without departing from the spirit of my invention.

Having thus described my invention, what I claim and desire to secure by United States Letters Patent is:

1. In a vehicle, the combination comprising a plurality of supporting wheels certain of which are for driving and others for steering the vehicle, a wheel suspension permitting each of at least two of said wheels to pivot about an axis parallel to the plane of such wheel, mechanism for steering the vehicle and automatic means, responsive both to the speed of travel of the vehicle and to the degree each steering wheel of the vehicle is turned, but operable independently of the steering mechanism, for tilting at least two of the vehicle wheels so that the top thereof inclines toward the right or left and corresponds to the direction the front of the vehicle is turning.

2. In a vehicle, the combination comprising a plurality of supporting wheels, vehicle steering mechanism, automatic means, responsive both to the speed of travel and to the turning movement of the vehicle but operable independently of the steering mechanism, for tilting at least two of the wheels so that the top thereof inclines to the right or left and toward the direction in which the vehicle is turned.

3. In a vehicle, the sub-combination comprising at least two supporting wheels, vehicle steering mechanism, automatic means, including a pendulum element, responsive both to the speed of travel and to the turning movement of the vehicle, for tilting at least two of the supporting wheels so that the top thereof inclines to the right or left and opposite to the direction in which such wheels would otherwise tend to skid when a transverse thrust is exerted on such wheels.

4. In a vehicle, the combination comprising a plurality of supporting wheels, including at least one steering wheel and at least two driving wheels, steering mechanism connected to said steering wheel, a driving axle pivotally connected to each driving wheel so as to admit of the tilting of the wheel in a vertical plane, means for tilting the driving wheels, including a fluid power cylinder, a reciprocatable piston mounted therein, a piston rod secured to the latter, means for connecting said rod to a driving wheel at a point to one side of the axle thereof, a trunnion secured to said piston rod and movable therewith, a main lever having a forked end which slidably engages said trunnion, the latter serving as a fulcrum for said lever under certain conditions of operation, a slide bar pivotally connected to said lever, a supplemental bell-crank lever, a link connecting one end of the latter to the main lever at a point intermediate the ends of the latter, a ported valve for controlling the supply of motive fluid to the opposite ends of said power cylinder, the same including a ported cylinder and an elastically mounted ported piston reciprocatably mounted therein, a piston rod projecting from said cylinder and secured to said piston, the latter being pivotally connected with the main lever, motive fluid inlet and outlet conduits connected to the latter cylinder and normally sealed against communication with each other by said valve piston, conduits leading to said opposite ends of said power cylinder from points on said valve cylinder on opposite sides of the entrance of the said intake conduit, pressure regulating valves interposed in each of said conduits, means for interconnecting said steering mechanism with said bell-crank lever, and means for continually maintaining a supply of motive fluid under pressure at said intake entrance.

5. In a vehicle, the combination comprising a plurality of supporting wheels, including at least one steering wheel and at least two driving wheels, steering mechanism connected to said steering wheel, a driving axle pivotally connected to each driving wheel so as to admit of the tilting of the wheel in a vertical plane, means for tilting the driving wheels, including a fluid power cylinder, a reciprocatable piston mounted therein, piston rods secured to the latter, means for respectively connecting said piston rods to said driving wheels at a point to one side of the axle thereof, a trunnion secured to one of said piston rods and movable therewith, a main lever having a forked end which slidably engages said trunnion, the latter serving as a fulcrum for said lever under certain conditions of operation, a slide bar pivotally connected to said lever at a point intermediate the ends of the latter, a ported valve for controlling the supply of motive fluid to the opposite ends of said power cylinder, the same including a ported cylinder and an elastically mounted ported piston reciprocatably mounted therein, a piston rod projecting from said valve cylinder and secured to said valve piston, the latter being pivotally connected with the main lever, motive fluid inlet and outlet conduits connected to said valve cylinder and normally sealed against communication with each other by said valve piston, conduits leading from the valve cylinder on opposite sides of the entrance of the said intake conduit, pressure regulating valves interposed in each of said conduits, a rock-shaft operatively connected to said slide bar for actuating the same and the main lever connected thereto; pendular means suspended from said rock-shaft for actuating the same, said pendular means being directly responsive to the varying centrifugal forces acting thereon and which are dependent upon the speed at which the vehicle is rounding a turn in the road; and means for continually maintaining a supply of motive fluid under pressure at said intake entrance.

6. In wheel-tilting means for vehicles, the sub-combination comprising at least two supporting wheels articulated to axles supported by the vehicle so as to be tiltable in a vertical plane, power cylinder means, piston means reciprocatably mounted therein, piston rods extending from opposite ends of said power cylinder means and connected to said piston means and also being operatively connected to said wheels, motive fluid supply means for delivering in rapid succession a series of pressure impulses to said piston, said fluid supply means including a continually operating fluid pump, a control valve, a conduit having a pressure regulating valve interposed therein, connecting the intake of the control valve and said pump, conduits interconnecting opposite sides of said control valve with the opposite ends of said cylinder, respectively, a return conduit connecting said control valve and said pump, said control valve normally affording free communication between said intake and return conduits connecting opposite sides of said control valve with the opposite ends of said power cylinder respectively, and means responsive to the change of direction of the path of travel of the vehicle when rounding a turn in the road for actuating said control valve and effecting the tilting of the top of said wheels, left or right, to correspond to the direction the vehicle is turning.

7. In a vehicle, the sub-combination comprising a frame having front and rear axles, wheels mounted on the respective ends of each axle and certain of said wheels being articulated to the respective supporting axle thereof, the joint between each articulated wheel and its axle lying substantially in the plane of such wheel, steering mechanism articulated to a pair of said wheels for turning the same and power-operated means, operable independently of the steering mechanism, for tilting the top of said articulated wheels, right or left, according to the direction the vehicle is travelling when rounding a turn in the road.

8. In a vehicle, the combination comprising supporting wheels, an axle on which the same are mounted and to which the same are articulated so as to be capable of tilting about an axis parallel to the longitudinal axis of the vehicle, manual steering mechanism for said vehicle and power operated automatic mechanism, including pendular means responsive to the turning movement of said vehicle and also to the speed thereof when rounding a turn in the road, for effecting the tilting of such articulated wheels so that the tops thereof lean right or left according to the direction the vehicle is turning.

9. In a vehicle, the combination comprising a plurality of supporting wheels certain of which are for driving and others for steering the vehicle, a wheel suspension permitting at least two of said wheels to pivot about a horizontal axis and means, including a pendulum element, responsive both to the speed of travel of the vehicle and the degree the steering wheels of the vehicle are turned, for effecting the tilting of the wheels which are so suspended as to be capable of pivoting about a horizontal axis.

10. In a vehicle, the combination comprising a plurality of supporting wheels, including at least one steering wheel and at least two driving wheels, steering mechanism connected to said steering wheel, a driving axle pivotally connected to each driving wheel so as to admit of the tilting thereof on an axis transverse to said axle, means including a pendulum which is responsive to both the speed at which the vehicle is rounding a turn and to the extent the said vehicle is turning, for tilting said driving wheels simultaneously and means for maintaining the wheels when so tilted in a tilted position irrespective of ordinary ruts or obstacles in the road during the period that the vehicle continues to travel in the same direction that resulted in such tilt of the wheel.

11. In a vehicle, the sub-combination comprising steering mechanism for effecting the turning of the vehicle, power operated mechanism for tilting the wheels of the vehicle when the vehicle is turned when rounding a bend in the road, said power operated mechanism being adapted to be set in operation by the movement of the steering mechanism and means for admitting of the independent steering of the vehicle by the steering mechanism in the event of a jam in the power operated mechanism which prevents the tilting of the wheels by said power operated mechanism when a further movement of the steering mechanism is effected by the operator of the vehicle.

12. In a wheel-tilting mechanism for automobiles, the sub-combination comprising an underframe, main springs mounted beneath said frame, an axle housing mounted on said springs, rotatable driving axles mounted in said housing, driving wheels respectively connected to said axles, means including horizontally disposed trunnions for articulating each wheel to said axle housing, a cross brace pivotally secured to one of said trunnions about which one of said wheels is adapted to tilt and extending across said frame and pivotally connected to the opposite side of said frame from that at which such trunnion is located.

13. In a wheel-tilting mechanism for automobiles, the sub-combination comprising an underframe, rear axles extending outwardly from opposite sides of said frame, a housing surrounding said axles, main springs supporting said axle housing with respect to said frame, said springs being supported by said frame, means including horizontally disposed trunnions extending at right angles to said axle for articulating driving wheels to the axle housings, a cross brace articulated to one of said trunnions and extending across the frame and means for securing said brace to said frame on the side thereof distant from said latter trunnion.

14. In a wheel-tilting mechanism for automobiles, the sub-combination comprising an underframe, main springs supported from opposite sides thereof, an axle housing supported on said springs, separate rear driving axles mounted within said housing, supporting wheels for said frame respectively mounted on said axles, means including a horizontal trunnion extending at right angles to said axles for articulating a wheel to such axle housing adjacent each of its ends, a cross brace pivotally secured to one of said trunnions adjacent one of said wheels, extending across the frame and pivotally secured to the opposite side of the frame from that on which said trunnion is located.

15. An automobile chassis comprising a frame, road-wheels, frame suspension means mounting the frame upon the wheels, and means to bank the wheels in a direction opposite the direction of a side thrust comprising wheel spindles pivotally mounted upon the frame suspension means, hydraulic jacks on the said suspension means with control links attached to arms of the spindles at a distance from the pivots and adapted to fix and alter the angle of the spindles, a shiftable weight on the frame actuated by said thrust and returnable to a normal position by gravity, and operating connections communicating movement of the weight to actuate the hydraulic jacks.

JAMES DOBSON ALTEMUS.